United States Patent
Barth et al.

(10) Patent No.: US 7,121,556 B2
(45) Date of Patent: Oct. 17, 2006

(54) MOLDED PLASTIC GASKET

(75) Inventors: David Michael Barth, Livonia, MI (US); Martin Novil, Northville, MI (US); Ronald W. Wangerow, Novi, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 10/819,538

(22) Filed: Apr. 7, 2004

(65) Prior Publication Data

US 2005/0242527 A1    Nov. 3, 2005

(51) Int. Cl.
*F02F 11/00*    (2006.01)
*F16L 17/06*    (2006.01)
*F16J 15/02*    (2006.01)

(52) U.S. Cl. .................. 277/596; 277/608; 277/615; 277/644; 277/649

(58) Field of Classification Search ............... 277/594, 277/596, 612, 615, 626–627, 628, 648–649
See application file for complete search history.

(56) References Cited

U.S. PATENT DOCUMENTS

| | | | | |
|---|---|---|---|---|
| 3,166,332 A | * | 1/1965 | Olson | 277/644 |
| 3,909,019 A | * | 9/1975 | Leko | 277/649 |
| 4,140,323 A | | 2/1979 | Jacobs et al. | |
| 4,778,189 A | | 10/1988 | Udagawa et al. | |
| 4,846,482 A | * | 7/1989 | Blodgett et al. | 277/591 |
| 5,122,214 A | * | 6/1992 | Zurfluh et al. | 156/220 |
| 5,228,702 A | * | 7/1993 | Browne et al. | 277/608 |
| 5,295,698 A | | 3/1994 | Agarwal et al. | |
| 5,421,594 A | * | 6/1995 | Becerra | 277/608 |
| 5,428,895 A | * | 7/1995 | Sihon | 29/888.3 |
| 5,785,322 A | | 7/1998 | Suggs et al. | |
| 6,186,513 B1 | * | 2/2001 | Udagawa | 277/593 |
| 6,231,053 B1 | * | 5/2001 | Wakamatsu | 277/628 |
| 6,343,795 B1 | | 2/2002 | Zerfass et al. | |
| 6,769,696 B1 | * | 8/2004 | Diez et al. | 277/593 |

FOREIGN PATENT DOCUMENTS

| | | |
|---|---|---|
| DE | 1917326 A1 | 10/1969 |
| DE | 3035581 A1 | 4/1981 |
| DE | 4421219 A1 | 8/1995 |
| DE | 19731492 A1 | 2/1999 |
| FR | 550298 A | 3/1923 |
| FR | 1118630 A | 6/1956 |
| GB | 380853 A | 9/1932 |

\* cited by examiner

*Primary Examiner*—Vishal Patel
(74) *Attorney, Agent, or Firm*—Ronald W. Wangerow; Harness, Dickey & Pierce, P.L.C.

(57) ABSTRACT

A gasket is provided having a body including at least one service aperture and an integrally formed sealing bead portion. In an embodiment, the sealing bead portion includes a first outwardly extending bead and a first concave channel opposite the first outwardly extending bead. The first concave channel is defined by a second outwardly extending bead and a third outwardly extending bead. In an alternative embodiment, the sealing bead portion includes an annular sealing member molded to the body, and the annular sealing member is opposite an outwardly projecting sealing bead. In a second alternative embodiment, the sealing bead portion includes an internal chamber filled with a pressurized gas. In a third alternative embodiment, the sealing bead portion defines a chamber filled a polymeric material.

10 Claims, 4 Drawing Sheets

MOLDED PLASTIC GASKET

FIELD OF THE INVENTION

The present invention relates to gaskets, and more particularly, to a molded plastic gasket.

BACKGROUND OF THE INVENTION

Gaskets have been used for many years for providing a sealed connection between two relatively static members. Gaskets typically require a compressive load between the members being sealed in order for the gasket to provide an effective seal. For example, a gasket placed between two stationary members, such as an engine block and an oil pan or an engine cylinder head and a valve/cam cover, is compressed between these elements.

One gasket design includes a molded plastic body having a solid molded sealing bead surrounding a central service aperture. The use of a solid molded sealing bead requires a large clamping force to ensure a good seal. The high clamping force results in a high compression force which in turn may cause the plastic to deform over time and thus reduce the effectiveness of the seal.

Accordingly, a need exists for a gasket having a sealing bead with a reduced propensity to deformation.

SUMMARY OF THE INVENTION

The present invention provides a gasket including a body defining at least one service aperture. A sealing bead is formed integral to the body and surrounds the service aperture. The sealing bead includes a first outwardly extending segment and a first concave channel opposite the first outwardly extending segment. The first concave channel is defined by a second outwardly extending segment and a third outwardly extending segment.

The present invention further provides an alternative embodiment in which a gasket has a body defining at least one service aperture and including an integrally formed sealing bead. The sealing bead includes an annular sealing member molded to the body, and the annular sealing member is opposite an outwardly projecting sealing bead segment.

In a second alternative embodiment, the present invention provides a gasket having a body defining at least one service aperture and a sealing bead integrally formed with the body. The sealing bead includes an internal chamber filled with a pressurized gas.

A third alternative embodiment of the gasket includes a body composed of a first polymeric material and defining at least one service aperture. The body has an integrally formed sealing bead. The sealing bead defines a chamber filled with a second polymeric material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
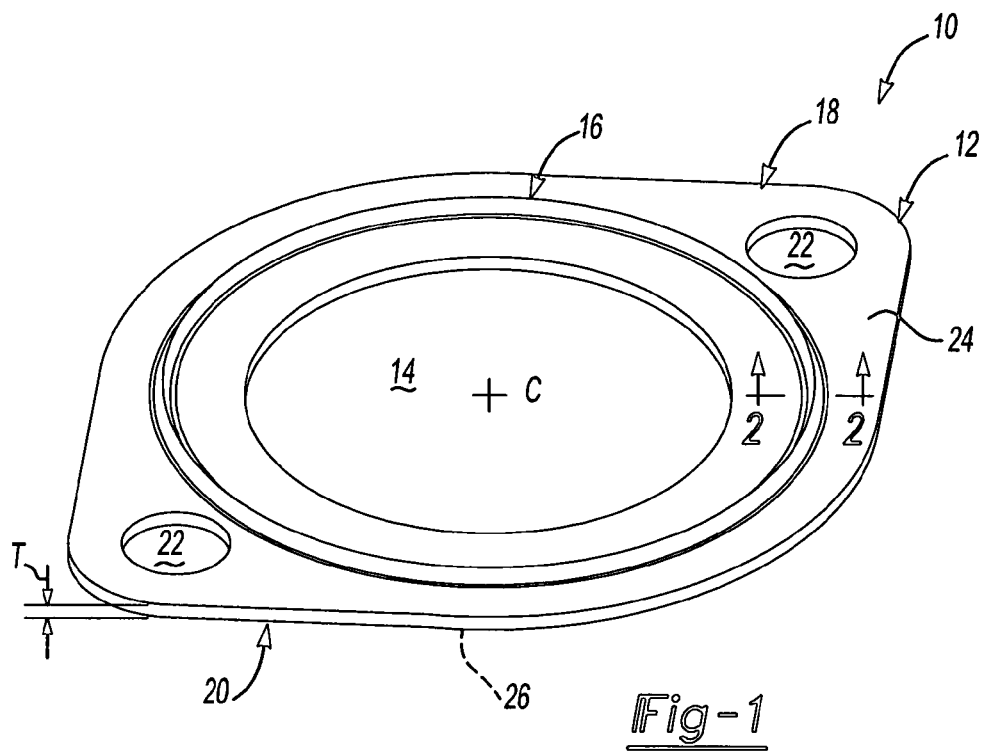
FIG. 1 is a perspective view of a molded plastic gasket according to the principles of the present invention.

Referring now to FIG. 1, a gasket 10 according to the principles of the present invention is shown. It will be understood that the shape of the gasket 10 is for illustrative purposes only and does not limit the scope of the present application. The gasket 10 will now be described as depicted in FIGS. 1–8, wherein common reference numbers are utilized to represent the same or similar elements. In overview, the gasket 10 has a body 12 including a service aperture 14 and a sealing bead portion 16.

With reference generally to FIGS. 1–8, the service aperture 14 is typically formed in the center of the body 12, along a centerline C. Preferably the body 12 is generally molded from a heat resistant polymer, such as, for example, glass fiber filled polyamide 12 (or other nylons) or glass fiber filled polyphenylene sulfides (PPS), which exhibit good flexibility, resistance to automotive fluids, and resistance to engine temperatures. The body 12 further has a first end 18, a second end 20 and a thickness T. The first end 18 and second end 20 may each further include a mounting aperture 22 for receipt of a fastening mechanism (not shown), such as, for example, a bolt or screw, therethrough. The body 12 also has a first surface 24 and a second surface 26. Although the body 12 is shown as being ring-shaped and the service aperture is illustrated as circular, it should be understood that other shapes can be utilized depending upon the size and shape of the surfaces to be sealed. Furthermore, the number of mounting apertures may also be varied depending upon the size and shape of the surfaces to be sealed.

Figure 2:
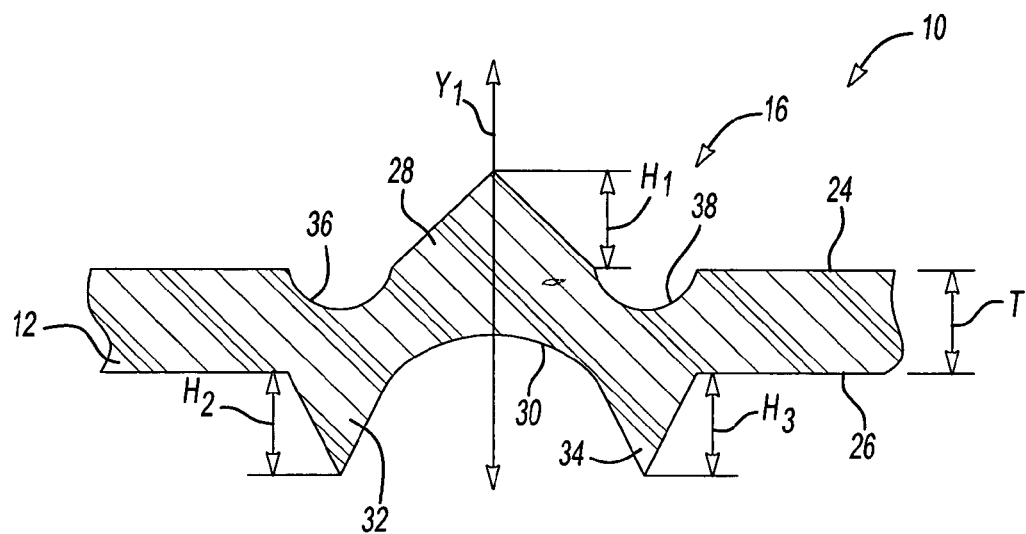
FIG. 2 is a cross sectional view taken along line 2—2 of FIG. 1.

In one embodiment, with specific reference to FIGS. 1 and 2, the sealing bead portion 16 surrounds the service aperture 14 and is integrally formed with the body 12. With reference to FIG. 2, the sealing bead portion 16 includes a first outwardly extending bead 28 which projects beyond the first surface 24 of the body 12. The first outwardly extending segment 28 has a height H1 which may be approximately equivalent to the thickness T of the body 12. The first outwardly extending bead 28 is opposite a first concave channel 30 formed in the second surface 26 of the body 12. The first concave channel 30 is defined in part by a second outwardly extending bead 32 and a third outwardly extending bead 34. Channel 30 may include a depth that is greater than a height of either or both of the second and third outwardly extending beads 32, 34. Both the second and the third outwardly extending beads 32, 34 are formed on the second surface 26 of the body 12. The second outwardly extending bead 32 has a height H2 and the third outwardly extending bead 34 has a height H3. Typically, the height H2 and height H3 are substantially the same, but it should be noted that the heights H2 and H3 can be varied according to the particular application. In this embodiment, the heights H2 and H3 are generally equivalent in size to the thickness T of the body 12.

The second and third outwardly extending beads 32, 34 are also generally opposite a second concave channel 36 and a third concave channel 38, respectively. The second and third concave channels 36, 38 are formed in the first surface 24 of the body 12 on opposite sides of the first outwardly extending bead 28. The sealing bead portion 16 of this embodiment ensures a tight seal through the first, second and third channels 30, 36, 38 which enable the sealing bead portion 16 to slightly deform under pressure without altering the effectiveness of the seal. Any of the outwardly extending beads 28, 32 or 34 can be of generally triangular, rounded, rectangular, or any of a wide variety of other cross-sectional shapes that will occur to those skilled in the art. Any or all of such beads can be of the same height relative to the body 12, or one or more of these beads can have a height relative to the body 12 that is different from that of any one or more of the other beads.

Figure 3:
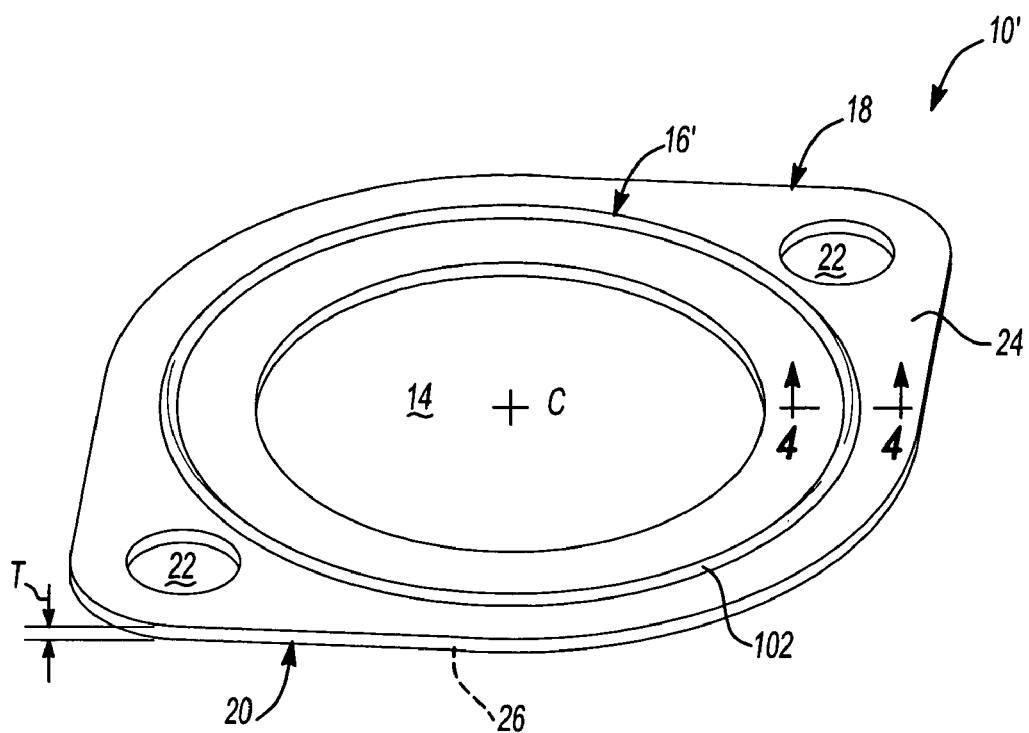
FIG. 3 is a perspective view of a molded plastic gasket according to an alternative embodiment of the present invention.
Figure 4:
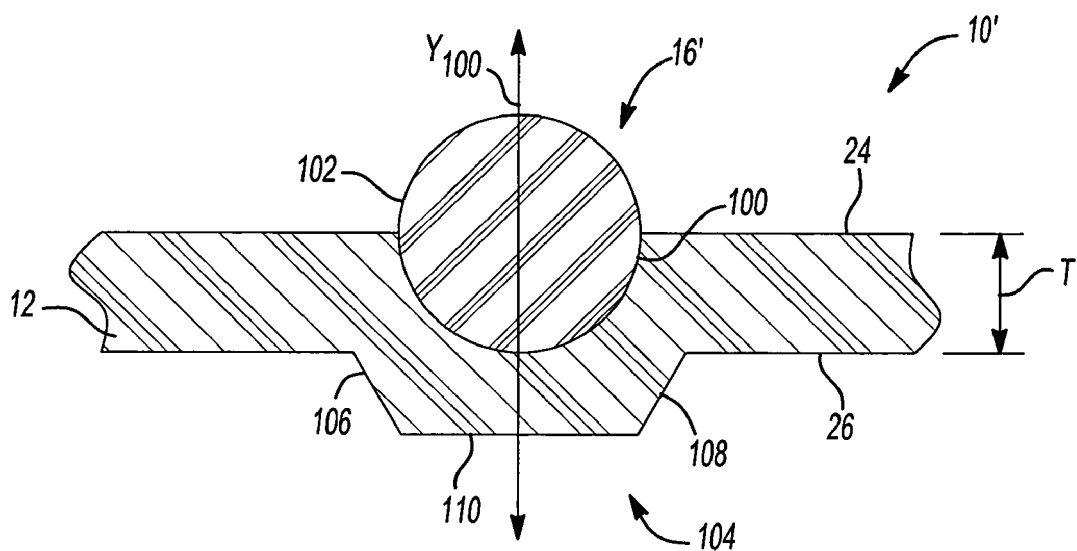
FIG. 4 is a cross sectional view taken along line 4—4 of FIG. 3.

An alternative embodiment of the gasket 10' is shown in FIGS. 3 and 4. In this embodiment, the sealing bead portion 16' includes an annular channel 100 for receipt of a compressible ring 102 therein. The compressible ring 102 may be integrally formed with the sealing bead portion 16' or affixed to the annular channel 100 in a post processing step. The compressible ring 102 may be formed of any elastomeric material, such as natural or nitrile rubber, for example, which exhibit a low degree of compressive stress relaxation.

Opposite the compressible ring 102 is an outwardly extending bead 104. The outwardly extending bead 104 includes a first angled sidewall 106 and a second angled sidewall 108 extending from a generally planar top portion 110. The outwardly extending bead 104 extends from the second surface 26 of the body 12. The sealing bead portion 16' is generally symmetric about a Y-axis Y100 of the sealing bead portion 16'. Although the outwardly extending bead 104 is shown in a polygonal shape, it shall be noted that the shape of the outwardly extending bead 104 can be varied according to the particular sealing application. The configuration of this sealing bead portion 16' provides resistance against deflection through the use of the compressible ring 102. Specifically, the compressible ring 102 provides a stress resilient surface for clamping against, thus ensuring the effectiveness of the seal over time.

Figure 5:
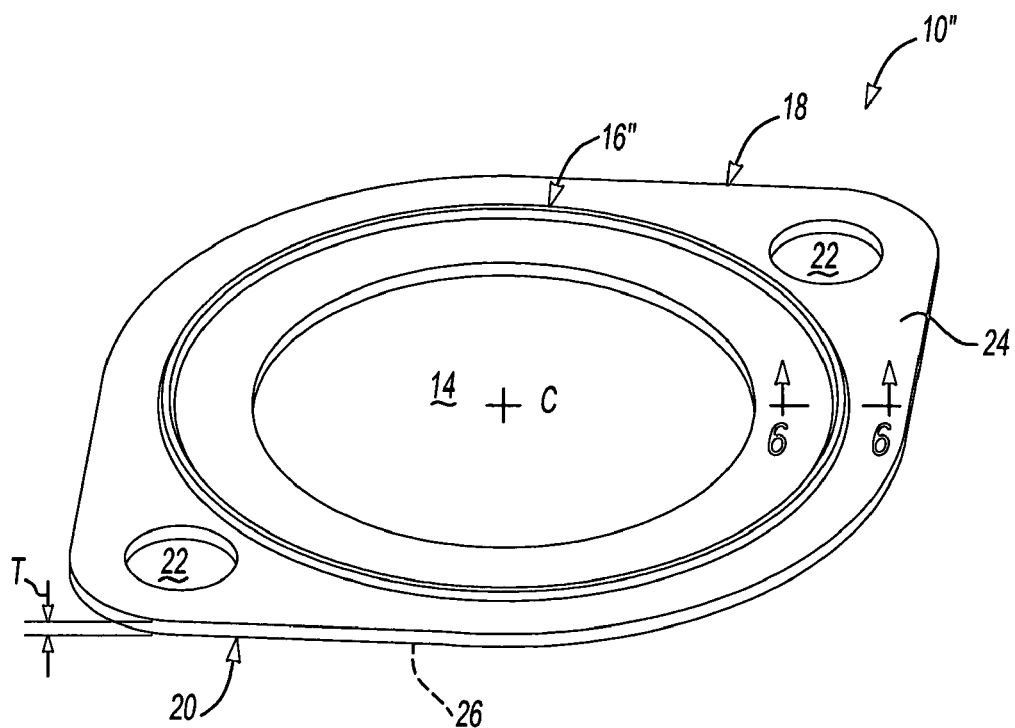
FIG. 5 is a perspective view of a molded plastic gasket according to a second alternative embodiment of the present invention.
Figure 6:
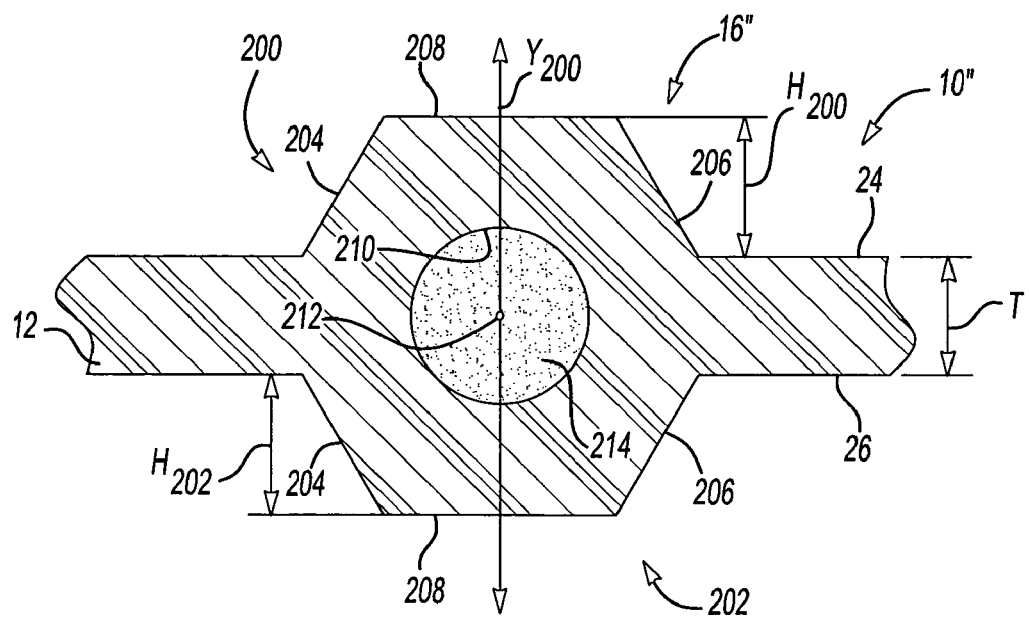
FIG. 6 is a cross sectional view taken along line 6—6 of FIG. 5.

With particular reference now to FIGS. 5 and 6, a second alternative embodiment of the gasket 10" is shown. In this embodiment, the sealing bead portion 16" includes a first outwardly extending bead 200 and a second outwardly extending bead 202 integrally formed with the body 12. The sealing bead portion 16" is generally symmetrical about a Y-axis Y200 of the sealing bead portion 16". The first and second outwardly extending beads 200, 202 each include a first angled sidewall 204 and a second angled sidewall 206 extending from a generally planar top portion 208. The first outwardly extending bead 200 extends from the first surface 24 of the body 12 while the second outwardly extending bead 202 extends from the second surface 26 of the body 12. The first outwardly extending bead 200 has a height H200 and the second outwardly extending bead 202 has a height H202. The heights H200 and H202 are approximately the same as the thickness T of the body 12, but can also be greater than or less than the thickness T, depending upon a particular application. Although the first and second outwardly extending beads 200, 202 are shown in a polygonal shape, it shall be noted that the shape of the first and second outwardly extending beads 200, 202 can be varied according to the particular sealing application.

Figure 7:
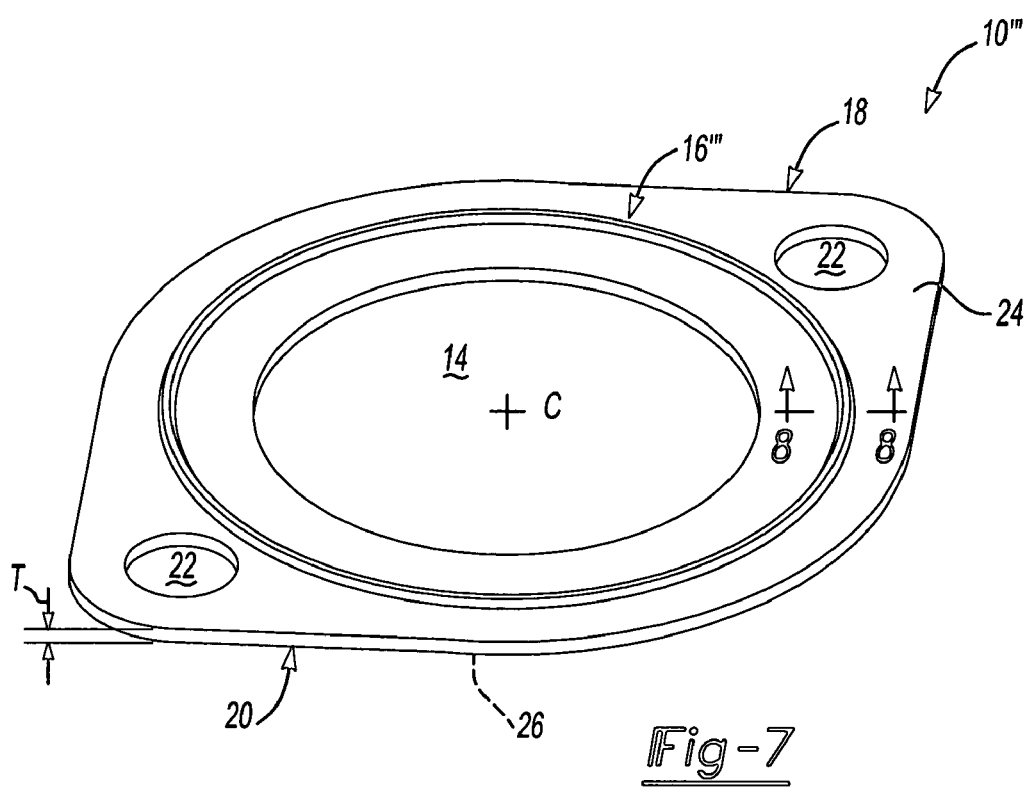
FIG. 7 is a perspective view of a molded plastic gasket according to a third alternative embodiment of the present invention.
Figure 8:
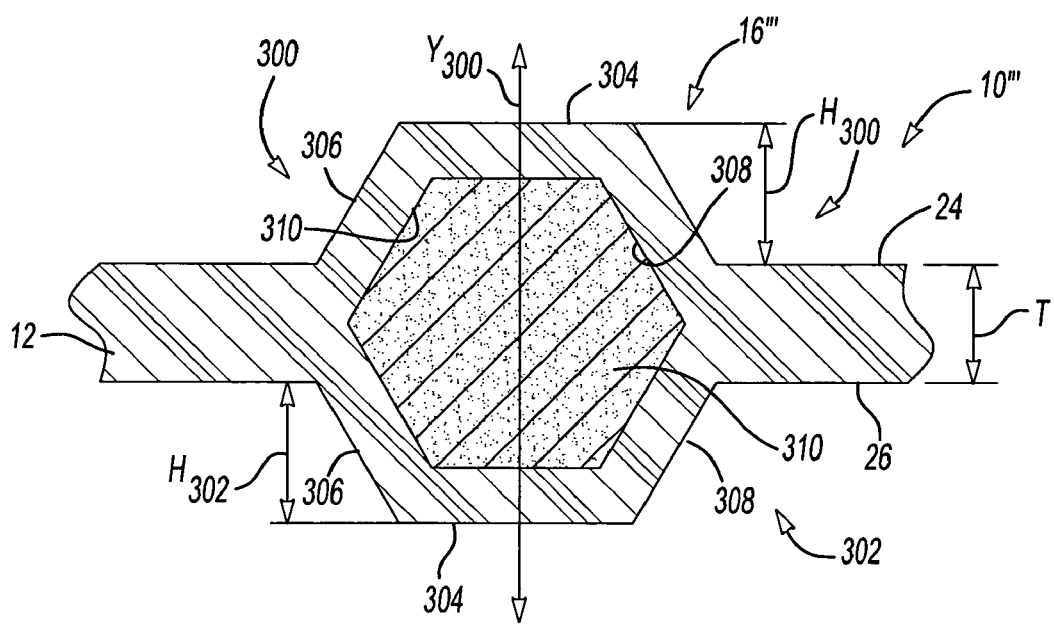
FIG. 8 is a cross sectional view taken along line 8—8 of FIG. 7.

The first outwardly extending bead 200 and second outwardly extending bead 202 are generally positioned opposite each other and define an annular channel 210 in a center 212 of the body 12. The annular channel 210 is configured for receipt of a pressurized gas 214. The pressurized gas 214 retained in the annular channel 210 may comprise nitrogen, argon, or other inert gases. The pressurized gas 214 located in the sealing bead A third alternative of the gasket 10''' present invention is illustrated in FIGS. 7 and 8. The sealing bead portion 16''' of this embodiment is integrally formed with the body 12 and includes a first outwardly extending bead 300 and a second outwardly extending bead 302. The first and second outwardly extending beads 300, 302 are generally symmetric with respect to a Y-axis Y300 of the sealing bead portion 16'''. The first outwardly extending bead 300 extends from the first surface 24 of the body 12 and the second outwardly extending bead 302 extends from the second surface 26 of the body 12. The first and second outwardly extending beads 300, 302 each include a top segment 304 extending between a first angled sidewall 306 and a second angled sidewall 308. The first outwardly extending bead 300 has a height H300 and the second outwardly extending bead 302 has a height H302. The heights H300 and H302 are generally larger than the thickness T of the body 12, although shorter heights may also be utilized according to a specific application. Although the first and second outwardly extending beads 300, 302 are shown in a polygonal shape, it shall be noted that the shape, as well as the size, of the first and second outwardly extending beads 300, 302 can be varied according to the particular sealing application.

The first and second outwardly extending beads 300, 302 define an inner chamber 308 for receipt of a core material 310 therein. The core material 310 may be comprised of a microcellular foam, including, for example, glass fiber filled polyamide 12 (or other nylons) or glass fiber filled polyphenylene sulfides (PPS), with microcellular pockets of nitrogen gas providing flexibility and elasticity or any other similar suitable material. The core material 310 is shown in the inner chamber 308, however, it shall be noted that the core material 310 could be located substantially throughout the body 12. The core material 310 provides a resilient clamping point, enabling the seal to maintain its integrity over time.

The gaskets 10, 10', 10", 10''' of the present invention generally ensure a tight seal over time by providing a resilient clamping point. In particular, the three concave channels 30, 36, 38, enable slight deformation without a decrease in seal strength while the compressible ring 102, the pressurized gas 214 and the core material 310 in FIGS. 5 through 8 create a sealing bead which are resilient.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A gasket comprising:
   a body made from a single homogenous thermoplastic material having first and second substantially planar parallel surfaces defining at least one service aperture therethrough; and
   a sealing bead portion integral to said body and surrounding said service aperture, said sealing bead portion including a first outwardly extending bead extending from said first surface and a first concave channel formed in said second surface opposite said first outwardly extending bead and being concave reative to said second surface, said first concave channel being disposed between a second outwardly extending bead and a third outwardly extending bead extending from said second surface, a second concave channel opposite said second outwardly extending bead and being concave relative to said first surface and a third concave channel opposite said third outwardly extending bead and being concave relative to said first surface, wherein said first, second, and third outwardly extending beads are generally triangular in cross-section.

2. The gasket of claim 1 wherein said body further comprises:
   a first end;
   a second end opposite said first end; and
   at least one mounting aperture located on at least one of said first end and said second end.

3. The gasket of claim 1 wherein said sealing bead portion is symmetric with respect to a centerline of the sealing bead portion.

4. The gasket of claim 1 wherein said first, second and third outwardly extending beads each have a height measurable from a top of the first, second and third outwardly extending beads to the body and the height is about equal to a thickness of the body.

5. The gasket according to claim 1, wherein at least one of said first, second and third outwardly extending beads extends outwardly from said body a distance that is different from a distance that at least one other of said first, second and third outwardly extending beads extends.

6. The gasket according to claim 2, wherein at least one of said first, second and third outwardly extending beads extends outwardly from said body a distance that is different from a distance that at least one other of said first, second and third outwardly extending beads extends.

7. The gasket according to claim 1, wherein at least one of said first, second and third outwardly extending beads extends outwardly from said body a distance that is different from a distance that at least one other of said first, second and third outwardly extending beads extends.

8. The gasket according to claim 1, wherein at least one of said first, second and third outwardly extending beads extends outwardly from said body a distance that is different from a distance that at least one other of said first, second and third outwardly extending beads extends.

9. The gasket according to claim 3, wherein at least one of said first, second and third outwardly extending beads extends outwardly from said body a distance that is different from a distance that at least one other of said first, second and third outwardly extending beads extends.

10. The gasket according to claim 1, wherein at least one of said first, second and third outwardly extending beads extends outwardly from said body a distance that is different from a distance that at least one other of said first, second and third outwardly extending beads extends.

* * * * *